United States Patent Office 3,699,094
Patented Oct. 17, 1972

3,699,094
CERTAIN NITROGEN-FLUORINE COMPOUNDS
AND METHODS OF PREPARATION
William Charles Firth, Jr., Wilton, and Simon Frank,
Stamford, Conn., assignors to American Cyanamid
Company, Stamford, Conn.
No Drawing. Original application May 9, 1963, Ser. No.
280,492. Divided and this application Oct. 22, 1965,
Ser. No. 505,308
Int. Cl. C08b 5/04; C07c 87/22, 103/10
U.S. Cl. 260—221                      4 Claims This application is a division of our copending application, Ser. No. 280,492, filed May 9, 1963.

This invention relates to a novel class of chemical compounds as well as to the methods of preparing the same. More particularly, the present invention is concerned with highly fluorinated aminomethyl compounds and how such compounds are prepared.

It is well known that fluorine is a potent oxidizer for rocket fuels. However, fluorine is a gas having an extremely low boiling point making the use of fluorine for rocket propulsion dependent upon the maintenance of cryogenic conditions.

In order to overcome some of the disadvantages of the use of fluorine, considerable research effort has been devoted to attempting to produce compounds containing a high percentage of available fluorine. In the course of such research it was discovered that fluorine bonded to carbon was not readily avaliable for oxidation of fuels while fluorine bonded to nitrogen was readily avaliable. Accordingly, our research has been directed toward producing compounds having a high percentage of fluorine attached to nitrogen.

Prior research into the preparation of oxidizers having a high percentage of available fluorine, such as $ClF_3$, $BrF_3$, tris(difluoramino)fluoromethane and $FClO_3$ had reached a limit in the progress of technology where the best that could be hoped for from theoretical considerations was a minor improvement in the specific impulse of fuel-oxidizer combinations based on extensive minor modifications of the proportions of fuel to oxidizer, hardware design, etc. In order to make a major improvement in the specific impulse of these fuel-oxidizer combinations, new compounds having a much higher percentage of available fluorine were needed. Quite unexpectedly and without any benefits of prior knowledge in this field we discovered a unique method of producing a highly valuable and heretofore unknown class of fluorine compounds.

Accordingly, an object of this invention is to provide a unique method of producing novel fluorine compounds.

Another object of this invention is to provide a unique group of fluorine compounds.

Other objects and advantages of this invention will become apparent from the following description and explanation thereof.

In a preferred aspect, the present invention is concerned with the reaction between (1) a compound in which a central carbon atom is multiply bonded to a nitrogen atom and also singly bonded to an additional nitrogen atom and (2) an acidic nitrogen-containing compound or reagent having active hydrogen to produce an addition product or adduct in which the nitrogen atom of the reagent adds or couples to the aforesaid central carbon atom.

The preferred starting compound in which a central carbon atom is attached by multiple and single bonds to separate nitrogen atoms may be represented by the following structural formula:

I.
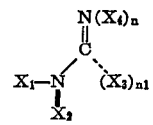

wherein $X_4$ is hydrogen or fluorine, $X_1$ and $X_2$ are the same or separate substituents such as fluorine, cyano, etc.;

$X_3$ is $-NF_2$, $-NF-\overset{NF}{\underset{}{C}}-NF_2$, $-NF-\overset{NF_2}{\underset{F}{C}}-NF_2$, $-NF-C\equiv N$,

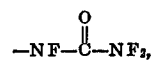

etc., and when $n$ is zero $n_1$ is also zero and when $n$ is one $n_1$ is also one, but when $n$ and $n_1$ are each one, the central carbon atom is doubly bonded to the nitrogen atom to which $X_4$ is also attached, and when $n$ and $n_1$ are each zero, then a triple bond exists between the central carbon atom and the nitrogen atom to which $X_4$ is otherwise attached.

Still more particularly, the starting fluorine compound may be represented by the formulae:

II.
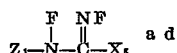
III.      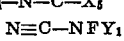

wherein $X_5$ is selected from the group consisting of $-F$, $-NF_2$, $-NF-\overset{NF}{\underset{}{C}}-NF_2$, $-NF-\overset{NF_2}{\underset{F}{C}}-NF_2$, $-NF-C\equiv N$ and

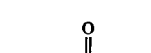

when $Z_1$ is fluorine, wherein $X_5$ is $-NF-C\equiv N$ when $Z_1$ is a cyano group, and wherein $Y_1$ is selected from the group consisting of

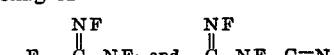

The starting fluorine compound described above is preferably reacted with a nitrogen-containing acid which has active hydrogen, and may be represented by the formula:

IV.           HR wherein R is a radical selected from $-N=C=O$, $-N=C=S$ and $-NHC\equiv N$.

The reaction between the fluorine-containing compound or reactant and the acidic reagent is an addition reaction and the results in an addition product or adduct, which to the best of our knowledge has never been produced before. The adduct may be represented by the following formulae:

V.
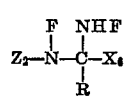

VI.
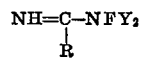

VII.
$$NH_2-\underset{R}{\overset{R}{\underset{|}{C}}}-NFY_2$$

wherein R, $X_6$, $Y_2$ and $Z_2$ include the radicals or substituents given in the descriptions of R, $X_5$, $Y_1$, and $Z_1$ in Formulae II–IV, inclusive, hereinabove. The substituents $X_6$, $Y_2$ and $Z_2$ include additional substituents for the reason that additional central carbons may be combined with the acidic reagent to similarly reduce the degree of unsaturation present therein. Further, the cyanamide compound has two active hydrogens, and therefore it can serve to saturate the multiple bonds in two different reagent molecules. Still further, where the fluorine-containing starting compound contains a plurality of central carbons and the acidic reagent contains a plurality of active hydrogens, complex adducts may be produced wherein the acidic reagent serves as a bridge between a pair of fluorine-containing compound molecules and the fluorine-containing compound can combine with a pair of such acidic reagent molecules. Thus, relatively large adduct molecules may be built up in this circumstance.

Accordingly, in Formulae V–VII inclusive, $X_6$ and $Y_2$ may include the moieties described in Formulae II–IV, as well as the following:

$X_6$ may include $$-NF-\underset{R_1}{\overset{NHF}{\underset{|}{C}}}-NF_2,\quad -NF-\underset{R_1}{\overset{}{\underset{|}{C}}}=NH,\quad \text{and}\quad -NF-\underset{R_1}{\overset{R_1}{\underset{|}{C}}}-NH_2$$

wherein $R_1$ is the same as R previously defined when $Z_1$ is fluorine and $Y_2$ may also include $$-\underset{R_2}{\overset{NHF}{\underset{|}{C}}}-NF_2\quad \text{and}\quad -\underset{R_2}{\overset{NHF}{\underset{|}{C}}}-NF-C\equiv N$$

wherein $R_2$ is the same as R previously defined.

It is also contemplated within the scope of the present invention to subject the adducts represented by Formulae V–VII inclusive to fluorinolysis to produce novel highly fluorinated products. The novel highly fluorinated products or adducts of importance may be represented by the following formula:

VIII.
$$F_2N-\underset{Q}{\overset{NF_2}{\underset{|}{C}}}-NFG$$

wherein Q is a nitrogen-containing moiety selected from the group consisting of $-NCO$, $-NCS$, $-NFC\equiv N$, $-NF_2$, $-NHCF=NF$, $-NFCF=NF$, $-NFCF_2NF_2$, and $-NFCF_3$ and wherein G is selected from the group consisting of fluorine, $$-\overset{NF}{\underset{}{\overset{\|}{C}}}-NF_2,\ -\underset{NF_2}{\overset{F}{\underset{|}{C}}}-NF_2,\ -\underset{Q_1}{\overset{NF_2}{\underset{|}{C}}}-NF_2,\ -C\equiv N,\ -CF=NF,\ -CF_2NF_2$$

$$-\overset{O}{\underset{}{\overset{\|}{C}}}-NF_2,\ -CF_3,\ -\underset{}{\overset{NCO}{\underset{|}{C}}}=NF,\ -\underset{}{\overset{NCS}{\underset{|}{C}}}=NF,$$

$$-\overset{FNC\equiv N}{\underset{}{\underset{|}{C}}}=NF,\ -\underset{NCS}{\overset{NCO}{\underset{|}{C}}}-NF_2,\ -\underset{FNC\equiv N}{\overset{FNC\equiv N}{\underset{|}{C}}}-NF_2$$

$$-\underset{NF_2}{\overset{NF_2}{\underset{|}{C}}}-NF_2\quad \text{and}\quad -\underset{NFCF_2NF_2}{\overset{NFCF_2NF_2}{\underset{|}{C}}}-NF_2$$

wherein $Q_1$ is the same as Q. Thus, it is the unusual characteristic of these novel highly fluorinated products that they contain a carbon tetranitrogen nucleus with large amounts of readily available fluorine attached to the nitrogens therein.

Among the most outstanding compounds thus produced are: $C(NF_2)_4$ or tetrakis(difluoramino)methane and $(F_2N)_3CNCO$ or tris(difluoramino)methyl isocyanate. These compounds have never been made before, and judging from past knowledge it would appear not possible to produce them.

The novel compounds of the present invention have many uses, particularly for those applications in which highly available fluorine content is desirable. The novel compounds may be used as oxidizers for the oxidation of rocket fuels of the liquid, hybrid, and solid types, explosives, and smoke generators, intermediates for the production of other fluorine-containing compounds, insecticides, herbicides, etc.

With respect to the use of the adducts as intermediates, it should be noted that they are highly fluorinated compounds containing reactive sites in the form of nitrogen to carbon unsaturations. For example, where the adduct contains a cyano group or a thiocyano group, it may be reacted with alcohols, carboxylic acids, amines, oxidizers, and hydrolysers. The nature of the reaction is similar for all the adducts of the present invention, and is exemplified by the following equations:

IX.
$$Z_2-\underset{N=C=X_7}{\overset{F\ \ NHF}{\underset{|\ \ \ |}{N-C}}}-X_6 + R_3OH \longrightarrow Z_2-\underset{\underset{H\ \ \ OR_3}{\underset{|\ \ \ |}{N-C=X_7}}}{\overset{F\ \ NHF}{\underset{|\ \ \ |}{N-C}}}-X_6$$

wherein $Z_2$ and $X_6$ have the meanings given in Equation V, above, $X_7$ is oxygen or sulfur and $R_3OH$ represents a lower alkyl alcohol, a glycol, a glycerol, pentaerythritol, phenol, polyvinyl alcohol, nitrocellulose, difluoraminomethanol, etc.

X.
$$\underset{N=C=X_7}{\overset{NH=C-NFY_2}{\underset{|}{}}} + R_3OH \longrightarrow \underset{\underset{H\ \ OR_3}{\underset{|\ \ \ |}{N-C=X_7}}}{\overset{NH=C-NFY_2}{\underset{|}{}}}$$

wherein $Y_2$ has the meaning given in Equation VI and $X_7$ and $R_3OH$ are the same as in Equation IX.

XI.
$$\underset{N=C=X_7}{\overset{N=C=X_7}{\underset{NH_2-C-NFY_2}{}}} + R_3OH \longrightarrow \underset{\underset{H\ \ OR_3}{\underset{|\ \ \ |}{N-C=X_7}}}{\overset{\overset{H\ \ OR_3}{\underset{|\ \ \ |}{N-C=X_7}}}{NH_2-C-NFY_2}}$$

wherein $Y_2$, $X_7$ and $R_3OH$ have the same meaning as given in Equations IX and X above.

When using an amine having the formula $R_4NH_2$ which may be ammonia, a lower alkyl amine, an aromatic amine, hydrazine, mono- or di- substituted hydrazine, a urea, an amide, an imide, nitramine, a mono-substituted nitramine, hydroxylamine, etc., then in each of the equations given above the cyanate or thiocyanate radical of the adduct is chemically united with the amine in the following manner:

XII. $-N=C=X_7 + R_4NH_2 \longrightarrow NH-\overset{X_7}{\underset{}{\overset{\|}{C}}}-NHR_4$ Also, similarly secondary amines may react in the following manner:

XIIa. $-N=C=X_7 + R_6NHR_7 \longrightarrow -NH-\overset{X_7}{\underset{R_6}{\overset{\|}{C}}}-\underset{|}{N}-R_7$ wherein $R_6$ and $R_7$ are alkyl groups.

In the hydrolysis of each of the adducts given in Equations IX–XI inclusive, the cyanate or thiocyanate radical is combined with water in the following manner:

XIII. $-N=C=X_7 + HOH \longrightarrow -NH_2 + COX_7$

Under certain conditions, the amine produced in Equation XIII may additionally react with a cyanate or thiocyanate radical as follows:

XIIIa. $-N=C=X_7 + -NH_2 \longrightarrow -NH-\overset{X_7}{\overset{\|}{C}}-NH-$ When using a carboxylic acid having the formula $R_5COOH$ wherein $R_5$ is an aliphatic or aromatic hydrocarbon radical, then in each of the equations given above the cyanate or thiocyanate radical of the adduct is chemically united with the carboxylic acid in the following manner:

XIV. 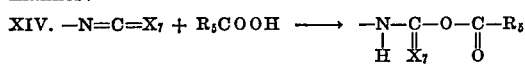

The product produced in Equation XIV may, under certain conditions, react further as follows:

XIVa. 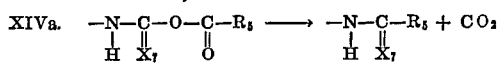

XIVb.

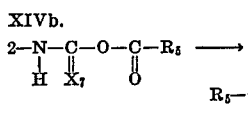

In a similar manner, those adducts containing a nitrile group may be reacted with hydrolyzers, alcohols, and amines. The nature of the reactions is similar for all the adducts of the present invention, and is exemplified by the following equations:

XV.

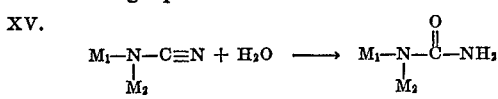

wherein $M_1$ and $M_2$ are the same or different substituents such as

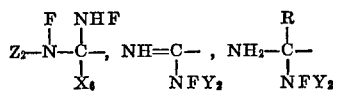

($Z_2$, $X_6$, $Y_2$, R have the meanings given in Equations V, VI, and VII above) and wherein $M_1$ may also be H. The above reaction in Equation XV may also proceed further under stronger hydrolyzing conditions as follows:

XVI. 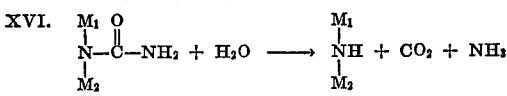

$M_1$ and $M_2$ have the meanings given in Equation XV.

When treating the adduct with an alcohol having the formula $R_6OH$ wherein $R_6OH$ may have the same meaning as $R_3OH$ given in Equation IX, above, the following reaction occurs:

XVII. 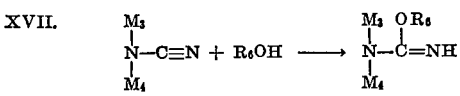

wherein $M_3$ and $M_4$ have the same meanings as $M_1$ and $M_2$, respectively, given in Equation XV.

When using an amine having the formula

wherein

may be a primary or secondary lower alkyl amine, an aromatic amine, hydrazine, mono- or di-substituted hydrazine, a urea, hydroxylamine, an amide, nitramine, a mono-substituted nitramine, an imide, the following reaction occurs:

XVIII. 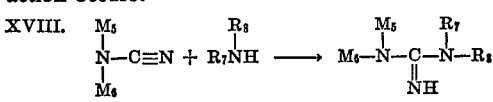

wherein $M_5$ and $M_6$ have the same meanings as $M_1$ and $M_2$, respectively.

The products produced according to Equations IX through XVIIII, inclusive have relatively high $NF_2$ to C ratios making them useful as oxidizers in rocket propellants and explosives. Additionally, since many of these products have relatively higher molecular weights, they have relatively lower vapor pressures (high-boiling liquids or solids) making them extremely useful as oxidizers or plasticizers. To further increase the $NF_2$ to C ratios, these compounds may be subjected to mild fluorinolysis to replace the remaining hydrogens with fluorines, as follows:

XIX. 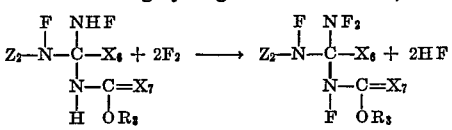

wherein the molecule on the left side of Equation XIX is the same as product on the right side of Equation IX.

XX. 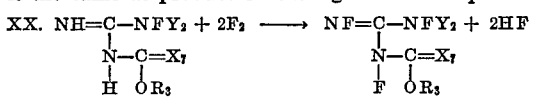

wherein the molecule on the left side of Equation XX is the same as the product on the right side of Equation X.

XXa. 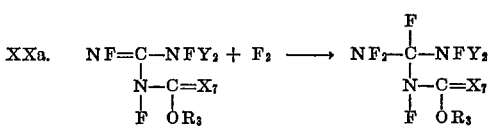

wherein the molecule on the left side of Equation XXa is the same as the product on the right side of Equation XX, illustrating further mild fluorinolysis thereof.

XXI. 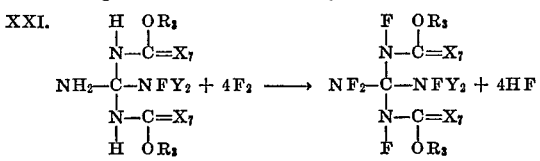

wherein the molecule on the left side of Equation XXI is the same as the product on the right side of Equation XI.

XXII.

wherein the moiety on the left side of Equation XXII is the same as the one produced on the right side of Equation XII.

XXIII.

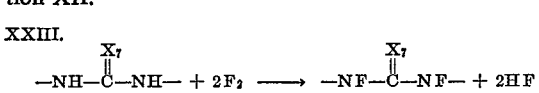

wherein the moiety on the left side of Equation XXIII is the same as the one produced on the right side of Equation XIII.

XIV. 

wherein the moiety on the left side of Equation XXIV is the same as produced on the right side of Equation XIVa.

XXV. 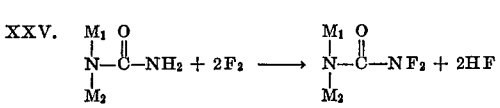

wherein the molecule on the left side of Equation XXV is the same as the product on the right side of Equation XV.

XXVI. 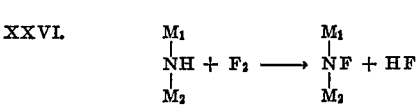

wherein the molecule on the left side of Equation XXVI is one of the products shown on the right side of Equation XVI.

XXVII. 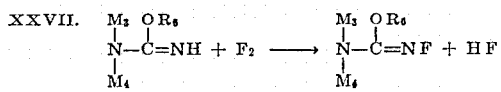

wherein the molecule on the left side of Equation XXVII is the same as the one shown on the right side of Equation XVII.

XXVIIa. 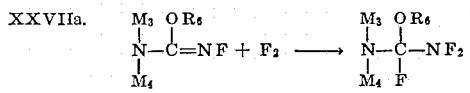

wherein the molecule on the left side of Equation XXVIIa is the same as the product on the right side of Equation XXVII, illustrating further mild fluorinolysis thereof.

XXVIII. 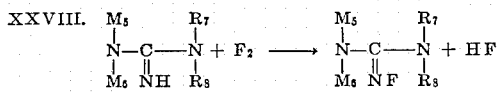

wherein the molecule on the left side of Equation XXVIII is the same as the one shown on the right side of Equation XVIII.

XXVIIIa.

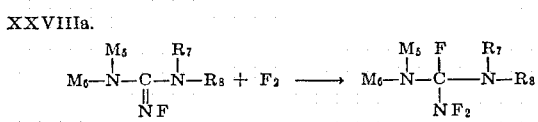

wherein the molecule on the left side of Equation XXVIIIa is the same as the product on the right side of Equation XXVIII, illustrating further mild fluorinolysis thereof.

In addition to the replacements of —H by —F shown in Equations XIX to XXVIIIa, inclusive, the corresponding conversion of

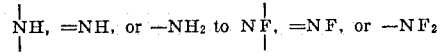

occurs when such are present within the substituents represented therein or wherein a substituent attached to a nitrogen is hydrogen.

The preferred starting fluorine compounds falling within the Formulae II and III are as follows:

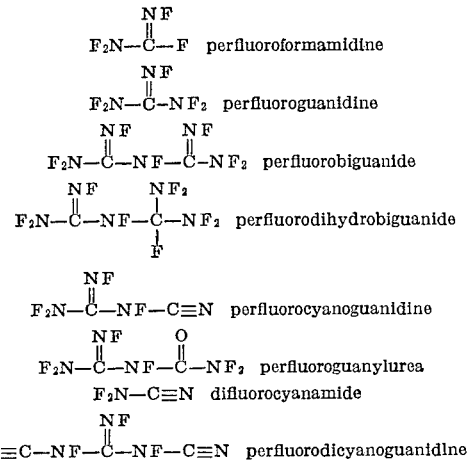

The foregoing highly fluorinated reactants of Formulae II and III may generally be prepared by aqueous fluorination or fluid-bed fluorination of appropriate hydrogen-containing compounds. Frequently, these fluorinations produce a plurality of products which may be separated by fractional codistillation to obtain the desired reactant. Aqueous fluorination involves bubbling a fluorine-containing gas through an aqueous dispersion of the appropriate hydrogen-containing compound. Fluid-bed fluorination involves contacting a fluidized bed of particulate hydrogen-containing compound with a fluorine-containing gas. Thus, difluorocyanamide may be prepared by aqueous fluorination of cyanamide. Also, difluorocyanamide, perfluoroformamidine, and perfluoroguanidine may be prepared by fluid-bed fluorination of biguanide and isolation of the desired reactant from the mixture produced.

It will be noted that "central carbons" of two types are represented in the starting fluorine compounds listed above, (a) carbons which are doubly bound to a fluorine-containing nitrogen and singly bound to an additional fluorine-containing nitrogen and (b) carbons which are triply bound to a nitrogen and singly bound to a fluorine-containing nitrogen. It is also to be noted that any given molecule may have only a single central carbon or may have a plurality of central carbons which are the same type or of different types.

The addition reaction to produce the adduct of Formulae V–VII is effected by means of a nitrogen-containing acid which is preferably cyanic, thiocyanic or cyanamide. Each acid has an active hydrogen and is capable of coupling with the central carbon atom of the fluorine-containing starting compound to produce a carbon-nitrogen bond therewith. The acid is employed in stoichiometric amounts to produce the desired adduct, or if desired, a deficiency of acid may be used for the reaction. About 0.5 to 1.0 equivalent of acid, based on the starting fluorine compound, may be used.

The addition reaction to produce the adduct of Formulae V–VII is also preferably conducted in the presence of an alkaline or basic catalyst. In this connection any base or alkaline material is useful, with varying degrees of success. The alkaline or basic catalyst may be sodium hydroxide, ammonium hydroxide, lithium carbonate, sodium carbonate, potassium bicarbonate, pyridine, quinoline, trimethylamine, dimethylaniline, tributylphosphine, triphenylphosphine, substituted ammonium compounds such as the quaternary ammonium compounds, urea, potassium cyanate, sodium cyanate, etc. We have also discovered that a white solid material which is produced as a by-product in the addition reaction to produce adduct may also serve as a catalyst. This white solid material is believed to contain

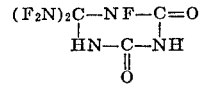

along with cyanic acid polymer.

The catalyst may be used for the reaction in an amount of about 0.01% to 10.0%, more usually about 0.1% to 0.5% based on the weight of the starting fluorine compound.

In producing the adduct of Formulae V–VII, a solvent may also be employed to provide intimate or uniform distribution of the reactants throughout the reaction mass and to dissipate the heat of reaction, and thus serve as a means of controlling the reaction. The solvents which can be used are, for example, pyridine, alkyl pyridines, liquid sulfur dioxide, sulfolane, the aliphatic ethers, e.g., methyl ether, ethyl ether, dioxane, tetrahydrofurane; the halocarbons such as trifluorochloromethane, carbon tetrachloride, trichlorotrifluoroethane; ketones, such as acetone, ethylmethylketone; esters, such as ethyl acetate. The solvent, when used, is used in an amount such that the starting fluorine compound and nitrogen-containing acid comprise about 5% to about 80%, and preferably about 20% to about 40% of the overall mixture.

The reaction to form the adduct of Formulae V–VII may be run over a wide range of temperatures, although generally a temperature of about −78° C. to +100° C., more usually about −35° C. to +35° C. may be used. The reaction is performed in the liquid phase, and accordingly for such a system it is preferred to employ a temperature of about −15° C. to +25° C. The pressure under which the reaction is conducted may also vary considerably from a subatmospheric pressure to superatmospheric pressure. Usually the reaction is performed between about 100 mm. Hg and about 760 mm. Hg. The reaction may proceed for from about 1 to about 48 hours but generally requires about 2 to 3 hours.

It is preferred to perform the addition reaction to form the adduct of Formulae V–VII under an inert atmosphere using such gases as nitrogen, carbon dioxide, helium, argon, and low molecular weight halocarbons.

It is generally preferred to use approximately stoichiometric proportions of the fluorine-containing compounds and the nitrogen-containing acid in proucing the adduct, but one can use other proportions as may be desired.

Illustrative of the adducts of Formulae V–VII are the following compounds:

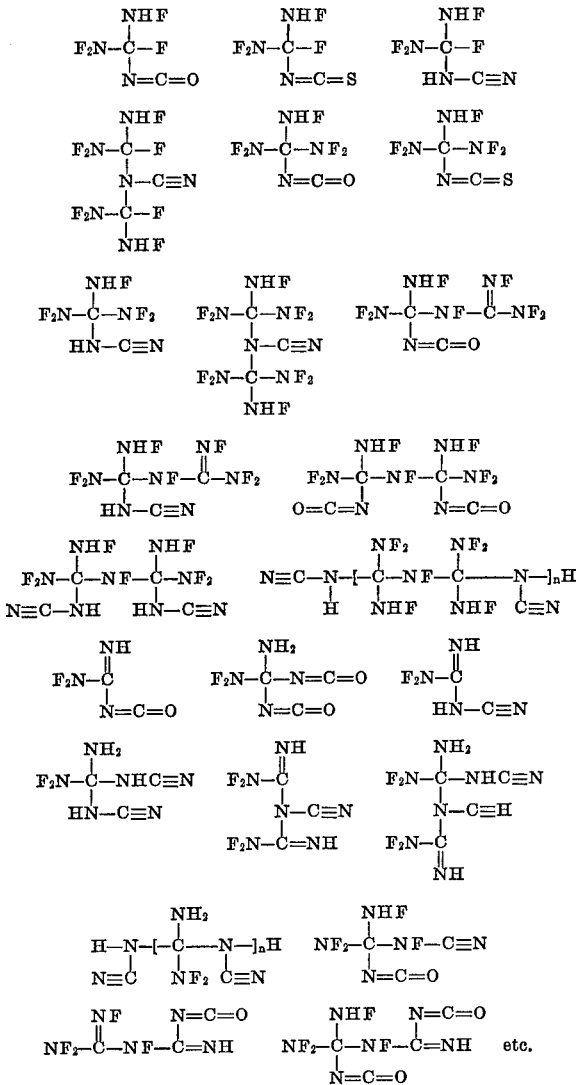

The adducts of Formulae V–VII thus produced may next be fluorinated to further increase the content of readily available fluorine contained in the molecule. Depending upon conditions this fluorinolysis may proceed by several mechanisms. The reaction conditions may, for the purpose of this discussion, be divided into mild conditions and drastic conditions.

The fluorination conditions to produce fluorinated adducts of Formulae VIII and XIX to XXVIII may involve generally a concentration of fluorine in the gas of about 4% to 100% by volume. The reaction may be conducted at a temperature of about $-50°$ C. to about $+100°$ C. and at a pressure of about 100 mm. Hg to about 5 atmospheres. The reaction may be instantaneous or take a time up to about 12 hours. The mild reaction conditions generally involve the lower ends of the foregoing ranges and the drastic conditions generally involve the upper ends of the foregoing ranges. Thus, mild monditions generally involve a concentration of fluorine of about 4% to about 20% by volume with a temperature of about $-50°$ C. to about $0°$ C. at a pressure of about 100 mm. Hg to atmospheric for a time shorter than about a half a minute. Drastic conditions generally involve high fluorine concentration in the gas of more than about 20% by volume with the reaction temperature about $0°$ C. to about $100°$ C. at a reaction pressure from about atmospheric to about 5 atmospheres and a residence time from about half a minute up to about 5 hours.

It is to be understood that all of the drastic conditions do not necessarily have to be present for the reaction conditions to be considered drastic nor do all of the mild conditions have to be present for the reaction conditions to be considered mild. Whether the reaction conditions are to be considered "mild" or "drastic" depends upon the net balance achieved by the interaction of all of the conditions involved.

Fluorination of the adduct using either mild or drastic conditions serves to replace the hydrogen introduced onto nitrogen formerly multiple bound to the central carbon with a fluorine so that the —NHF, =NH, or —NH$_2$ group becomes an —NF$_2$ or =NF group.

Mild fluorination conditions also preferentially serve to add F$_2$ to any unsaturations present in the adduct, that is by reducing the unsaturation still remaining therein. Thus, for example, where perfluorobiguanide is reacted with cyanic acid to saturate one central carbon leaving the other central carbon with a doubly bound nitrogen affixed thereto, addition of fluorine under mild conditions would tend to add one atom to the remaining =NF group and one atom to the

group to produce

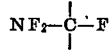

Under drastic conditions, the reaction of the fluorine with the adduct may serve to cleave bonds between the carbon and the groups affixed thereto or bonds between nitrogen and the groups affixed thereto and replace them with C—F or N—F bonds.

Another possible reaction under drastic conditions is the cleavage of bonds within the groups attached to the central carbon. For example, —N=C=O may be converted to —NF$_2$ by such drastic reaction conditions.

The reaction may result in a mixture of all four types of reaction products, with the drastic reaction conditions tending to give a greater proportion in the product of the cleavage reactions and the mild conditions tending to give a higher proportion of the addition reaction.

Illustrative of the products of such fluorination of the adducts within the scope of Formula VIII are the following:

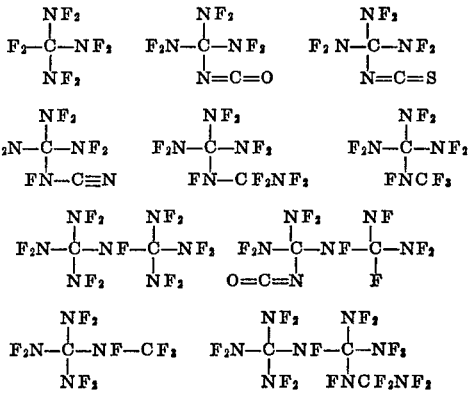

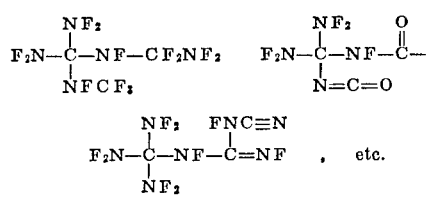

$F_2N-\underset{\underset{NFCF_3}{|}}{\overset{\overset{NF_2}{|}}{C}}-NF-CF_2NF_2 \quad F_2N-\underset{\underset{N=C=O}{|}}{\overset{\overset{NF_2}{|}}{C}}-NF-\overset{\overset{O}{\|}}{C}-NF_2$ $F_2N-\underset{\underset{NF_2}{|}}{\overset{\overset{NF_3}{|}}{C}}-NF-\overset{\overset{FNC\equiv N}{|}}{C}=NF$ , etc.

Adducts, as well as mildly fluorinated adducts, may further be reacted with materials containing active hydrogens. Illustrative of such active hydrogen compounds are $H_2O$, $R_3OH$, $R_4NH_2$, $R_6NHR_7$, and $R_5COOH$ (also $R_6OH$ and $R_7NHR_8$) as defined in Equation IX through XVIII, inclusive.

The active hydrogen compound may be employed in stoichiometric amounts in the reactions of Equations IX through XVIII, inclusive, or if desired, an excess or deficiency of active hydrogen compound may be used for the reaction. About 0.5 to 20.0 equivalents, and, preferably 0.9 to 2.1 equivalents of active hydrogen compound, based on the adduct, may be used. Frequently, this reaction will occur upon admixture of the two reactants alone or in an inert diluent, such as ether. In other cases, the presence of a catalyst is helpful. Such catalysts include basic catalysts, such as tertiary amines (e.g., triethylamine, triethylenediamine), acid catalysts, and metallic compounds, especially tin compounds, such as dibutyltin laurate, dimethyltin dichloride, tributyltin acetate, stannic chloride, etc.

These reactions may be conducted at a temperature of from about −50° C. to about +100° C., more usually from −15° C. to +35° C., and still more particularly from +5° C. to +25° C., and at a pressure of from about 100 mm. Hg to about 5 atmospheres, and more usually at about 1 atmosphere. Where catalysts are used, they generally are used at a concentration of 0.01% to 10.0% and more usually at a concentration of 0.1% to 1.0%, based on the weight of the other reactants.

Illustrative of the products of reacting such adducts with active hydrogen compounds as defined in Equations IX through XVIII are:

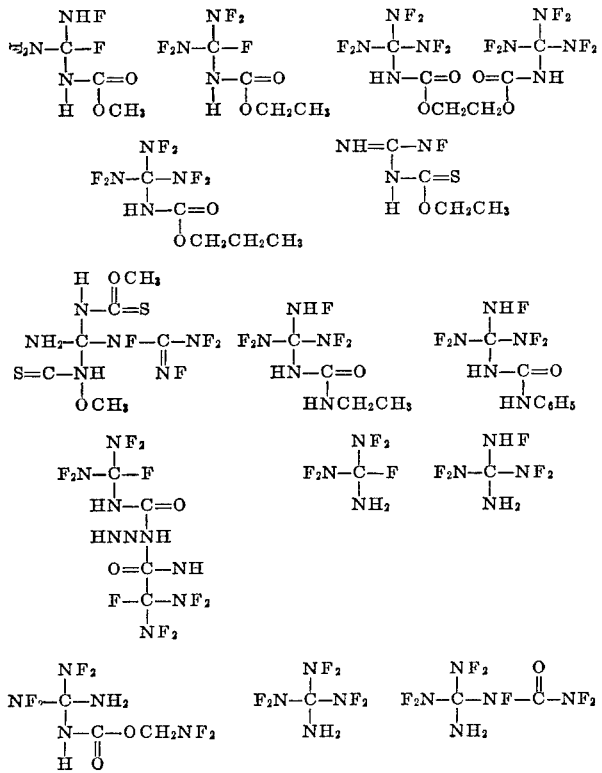

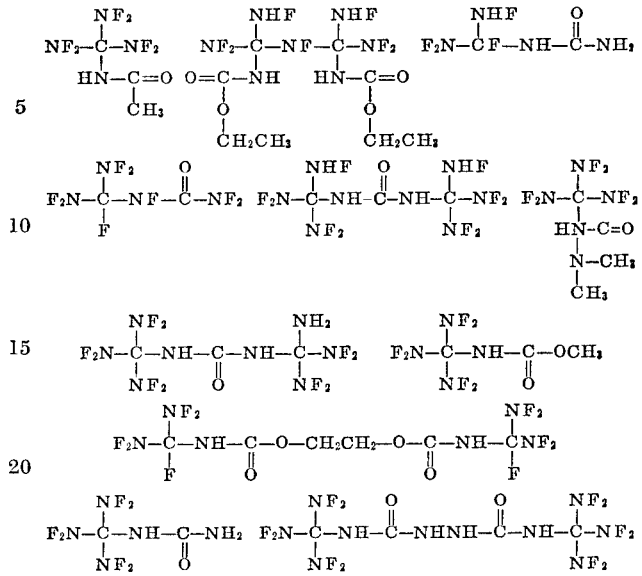

In any of the foregoing reactions wherein a mixture of products is produced, such mixture may be separated into its component parts by conventional techniques, such as gas chromatography, fractional distillation, fractional co-distillation, liquid-solid chromatography, fractional crystallization, etc., or by a sequence of a plurality of such techniques.

EXAMPLE 1

The following example illustrates the preparation of some starting materials (difluorocyanamide, perfluoroformamidine, and perfluoroguanidine) by fluid-bed fluorination of biguanide.

Five grams of biguanide admixed with 26.8 grams of sodium fluoride (both having approximately the same particle sizes, e.g., from about 80 to about 200 mesh) are placed in a fluid-bed reactor and fluidized by passing therethrough a carrier gas (4% $F_2$ and 96% He by volume) at a temperature of 70° C. for 4 hours. The product collected at −196° C. from the fluorination of the biguanide is stored as a gas in 9 bulbs, each about 450 ml. in volume. Difluorocyanamide is isolated from the crude product fractions by fractional codistillation technique [Anal. Chem., 31, 618 (1959)]. Difluorocyanamide is then passed through the fractional codistillation apparatus a second time to tyield a total of 7 mmoles of purified difluorocyanamide.

Similarly, using 2.5 grams of biguanide admixed with 25 grams of sodium fluoride and reacting for 2 hours at 2° C. with the carrier gas in the fashion indicated above, 22 mmoles of volatiles are collected. Fractional codistillation permits separation into 27% perfluoroformamidine, 18% perfluoroguanidine, and 8% difluorocyanamide.

EXAMPLE 2

The following example illustrates the preparation of a starting material (difluorocyanamide) by aqueous fluorination.

To a 300 ml. round-bottomed flask having a 24/40 ST joint is added 46 ml. (44 g.) of a 50% aqueous cyanamide solution. To this solution is added an aqueous slurry (buffering agent) prepared in the following manner:

Seventeen (17) g. $NaH_2PO_4 \cdot H_2O$ mixed with 45 g. $Na_2HPO_4 \cdot 12H_2O$ is slurried with 5 ml. of water. Some of this phosphate slurry dissolves in the cyanamide solution but most of it settles to the bottom of the flask.

The flask is fitted with an inlet tube extending approximately 3 cm. below the surface of the liquid, the pH of which is 5.6. An exit tube positioned above the liquid surface and extending out of the flask leads downstream to four cold traps (two at −78° C. and two at −196° C.) for isolation of the volatile fluorination products.

The 300 ml. flask is surrounded by a large beaker of water at about 9° C. A stream of helium is started bubbling through the solution in the flask at a rate of about 700 ml./min. Slowly $F_2$ is mixed with the helium stream until, after about 3–4 minutes, a flow of about 40 ml./min. is attained. These helium and fluorine flow rates are maintained throughout the reaction period. The water bath surrounding the reaction flask is maintained between 9° C. and 12° C. by adding small amounts of ice. After 55 minutes the solution (pH of 4.9) becomes dark red-orange in color and the flow of $F_2$ is stopped.

Isolation of the product retained in the two cold traps at −196° C. by vacuum-line technique (bulb-to-bulb distillation) yields 20 mmoles of product. Infrared analysis indicates that the composition of the product is approximately 70% DFC and 30% $CO_2$. Traces of other products amount to 1% or less of the total product. From a bulb containing 7.5 mmoles of the crude product is obtained 5.4 mmoles of pure difluorocyanamide.

EXAMPLE 3

The following example illustrates the reaction of perfluoroguanidine with cyanic acid to produce bis(difluoramino)fluoraminomethyl isocyanate.

Equal molar amounts (1.5 mmoles) each of perfluoroguanidine and cyanic acid were condensed at −196° C. into a flamed 1.3 ml. nuclear magnetic resonance tube equipped with a Fisher-Porter needle valve and containing powdered urea as a catalyst (0.15 mmole or 0.0090 gram). The reaction was allowed to proceed at about −30° C. (produced by a magnesium chloride-ice mixture) for about 3 hours followed by about 1 hour at room temperature (about 25° C.).

All products which were volatile at room temperature were isolated by transfer on a vacuum line into a condensing bulb cooled to −196° C. This bulb was then allowed to warm up to room temperature which then permitted vapors to pass from this bulb into a trap cooled to −50° C. (by a calcium chloride-ice mixture) and from this trap into another condensing bulb cooled to −196° C. The material volatile at −50° C. consisted of small amounts of unreacted perfluoroguanidine and cyanic acid while the material condensed in the −50° C. trap consisted only of bis(difluoramino)fluoraminomethyl isocyanate. The yield of bis(difluoramino)fluoraminomethyl isocyanate was about 54%.

EXAMPLE 4

The following example illustrates the reaction between perfluoroformamidine and cyanic acid to produce difluoramino(fluoramino)fluoromethyl isocyanate.

0.116 gram of perfluoroformamidine and 0.43 gram of cyanic acid are introduced on a vacuum line into a 10 cc. evacuated bulb containing 0.010 gram of urea as a catalyst. The reaction is allowed to proceed for about 3 to 5 hours at −30° C. followed by about 1 to 2 hours at room temperature. After pumping off any volatile materials, the less volatile residue is distilled under vacuum at room temperature into a cold receiver. The distillate thus produced and collected in the receiver is difluoramino(fluoramino)fluoromethyl isocyanate which may be characterized by infra-red spectra, gas chromatography, molecular weight determinations, etc.

EXAMPLE 5

In a similar manner perfluorobiguanide is reacted with two equivalents of cyanic acid utilizing KOCN as the catalyst. A mixture of products is produced wherein one and both C=N groups are saturated by the cyanic acid. These products may also be characterized by infra-red spectra, gas chromatography, molecular weight determinations, etc.

EXAMPLE 6

The following example illustrates the fluorination of bis(difluoramino)fluoraminomethyl isocyanate to produce tetrakis(difluoramino)methane and tris(difluoramino)methyl isocyanate.

Bis(difluoramino)fluoraminomethyl isocyanate was fluorinated by sweeping a fluorine-helium gas mixture for an extended period of time at low temperatures over such material. Entrained in the exiting fluorine-helium gas mixture were the reaction products, tetrakis(difluoramino)methane and tris(difluoramino)methyl isocyanate along with assorted by-products as shown in the accompanying table.

These products were collected by passing the exiting fluorine-helium gas mixture containing the products through an HF trap (a U-shaped tube which is filled with sodium fluoride pellets), then through a first cold trap (a U-shaped tube chilled to −78° C. or −196° C.) and then into a second cold trap maintained at −196° C. Non-condensables at −196° C. were passed out through a bubbler.

TABLE

| | | Fluorination conditions | | | | | Products | | | | |
|---|---|---|---|---|---|---|---|---|---|---|---|
| Run No. | Bis, mmole | He, cc./min. | $F_2$, cc./min. | Temp., °C. | Duration, minutes | Other | Tris, mmole | Yield, percent | Delta, mmole | Yield, percent | Others, mmole |
| 1 | 0.70 | 350 | 10 | −30 | 60 | Note A | 0.16 | 23 | .084 | 12 | [1] 0.49 |
| 2 | 1.1 | 350 | 10 | −30 | 60 | ...do... | 0.20 | 18 | 0.16 | 14 | [1] 0.48 |
| 3 | 2.16 | 350 | 10 | −30 | 140 | ...do... | 0.62 | 28 | 0.48 | 22 | [1] 1.0 |
| 4 | 1.6 | 350 | 10 | −30 | 120 | ...do... | 0.41 | 26 | 0.45 | 28 | 1.2 |
| 5 | 1.4+1.0 | 350 | 10 | −30 | 90+80 | Note B | 0.2 | 10 | 1.0 | 43 | 2.5 |

[1] $SiF_4$, $NO_2$ and unknowns.
Note A=HF trap filled with NaF pellets and at 25° C.
Note B=Fluorination as for Runs 1-4 except that adduct was fluorinated in two portions and products combined.
NOTE.—Bis=bis(difluoramino)fluoraminomethyl isocyanate; Tris=tris (difluoramino)methyl isocyanate; Delta=tetrakis(difluoramino)methane.

EXAMPLE 7

The following examples illustrates the reaction of tris(difluoramino)methyl isocyanate with methanol to produce a carbamate.

A Pyrex nuclear magnetic resonance tube of approximately 1.3 ml. volume was used as a reactor for this reaction. This reactor could be opened and closed by means of a Teflon needle valve, and could be connected to a vacuum line by means of a ground-glass connection.

Ten microliters (0.25 mmole) of reagent grade methanol was added from a microliter syringe to a dry reactor as described above. The reactor was then cooled in liquid nitrogen and evacuated, and 0.28 mmole of tris(difluoramino)methyl isocyanate was condensed therein. The reaction was allowed to proceed for 80 minutes at 0° C. and then for 10 minutes additional at room temperature. A small amount of volatile material was condensed out of the reactor. The residual liquid was methyl N-tris(difluoramino)methylcarbamate according to infrared and nuclear magnetic resonance (H' and $F^{19}$) analyses. However, the H' nuclear magnetic resonance analysis indicated that the product was not completely pure. Upon purification, this carbamate is a solid with a melting point of 43–44° C. Calculated for $C_3H_4F_6O_2$; 47.09% F. Found 47.70% F.

EXAMPLE 8

The following example illustrates the reaction of tris(difluoramino)methyl isocyanate with ammonia to produce a urea.

A dry reactor (as described in Example 7) was charged with about 0.3 ml. of anhydrous ethyl ether and degassed at −196° C. Tris(difluoramino)methyl isocyanate (0.2 mmole) was condensed into the ractor and allowed to dissolve into the ether when the reactor was warmed to room temperature. Then 0.2 mmole of anhydrous ammonia was condensed into the tube at −196° C. This reaction mixture was then warmed to room temperature in 10 minutes and allowed to remain at room temperautre for an additional 20 minutes. The volatiles were removed from the resulting solution leaving a white oxidizing solid residue, whoe infrared spectrum indicated the presence of tris(difluoramino)methylurea, a solid which could be vacuum sublimed.

EXAMPLE 9

The following example illustrates the hydrolysis of tris(difluoramino)methyl isocyanate to produce an amine.

A dry reactor (as described in Example 7) was charged with 0.7 mmole of water, cooled to about −196° C. and evacuated. After condensing 0.7 mmole of tris(difluoramino)methyl isocyanate into the reactor, it was permitted to warm up to room temperature. After allowing the reaction to proceed for 17 hours at about 25° C., the volatiles were fractionated in the vacuum line using a trap cooled to about −80° C. by a Dry Ice-acetone bath. The gas passing through the trap was largely carbon dioxide. The trap contained 0.5 mmole of tris(difluoramino)methylamine, a novel compound identified by its infrared spectrum and $F^{19}$ and $H^1$ nuclear magnetic resonance analyses.

The various products produced by the fluorination of the adducts are generally useful as oxidizers in conjunction with fuels for rocket propulsion. This is because they contain a large proportion of readily available fluorine (attached to nitrogen) for such oxidation reactions.

Also, these adducts and final products may serve as intermediates for the preparation of other compounds by reaction of the isocyanate portion or the C=N or C≡N portions with oxidizers, alcohols, amines, hydration agents, etc., to form other highly fluorinated aminomethyl compounds. As illustrative of the use of one of these compounds, tetrakis(difluoramino)methane, as an oxidizer for rocket propellants, the following data is presented:

| | $I_{sp}$ |
|---|---|
| $C(NF_2)_4 + N_2H_4 + N_2O_4$ | 329 |
| $C(NF_2)_4 + N_2H_4 + FClO_3$ | 322 |
| $C(NF_2)_4 + (CH_3)_2NNH_2 + N_2O_4$ | 320 |
| $C(NF_2)_4 + B_5H_9 + N_2O_4$ | 329 |

$I_{sp}$ is the theoretical specific impulse to be obtained by calculations utilizing the optimum proportions of the three ingredients presented.

In contradistriction to the above, the following data was obtained for previously known oxidizers:

| | $I_{sp}$ |
|---|---|
| $ClF_3 + N_2H_4$ | 295 |
| $FC(NF_2)_3 + N_2O_4 + N_2H_4$ | 314 |
| $FC(NF_2)_3 + N_2H_4 + FClO_3$ | 314 |
| $ClF_3 + B_5H_9$ | 290 |
| $FC(NF_2)_3 + FClO_3 + B_5H_9$ | 314 | from which the higher specific impulses obtainable with tetrakis(difluoramino)methane can be appreciated.

It is thus seen that $C(NF_2)_4$ shows improved or superior performance with common fuels such as hydrazine, unsymmetrical dimethyl hydrazine, or pentaborane as compared with other known fluorine based rocket oxidizers. Tetrakis(difluoramino)methane with a melting point of about −12° C. and a boiling point of about 45° C. further shows advantages in that it is a storable high energy liquid oxidizer which does not require extensive refrigeration for storage in contrast to other liquid oxidizers such as liquid fluorine, tetrafluorohydrazine, $N_2O_4$, $ClF_3$, etc.

We claim:
1. A compound having a structural formula

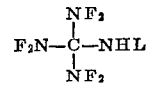

where L is selected from the group consisting of

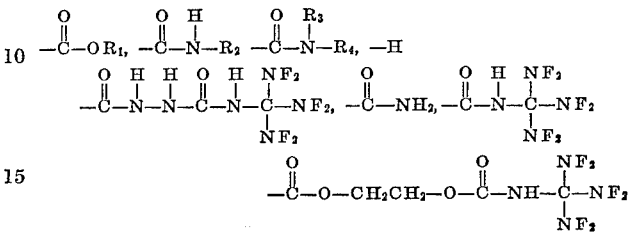

wherein $R_1$, $R_2$, $R_3$, and $R_4$ are each independently selected from the group consisting of lower alkyl, difluoroamino substituted lower alkyl, and aryl groups.

2. The process which comprises (1) reacting a reagent selected from the group consisting of

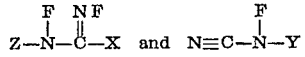

wherein —X is selected from the group consisting of

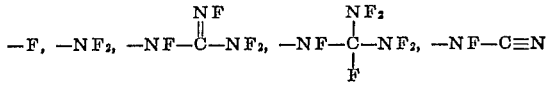

and

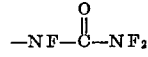

when Z— is F— and wherein —X is —NF—C≡N when Z— is N≡C— and wherein —Y is selected from the group consisting of

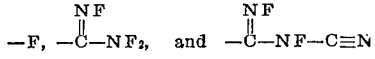

with an additive selected from the group consisting of HNCO, HNCS, and $H_2NC\equiv N$ to produce an adduct, and (2) reacting said adduct with a compound selected from the group consisting of a lower alkyl alcohol, an alkylene glycol, glycerol, pentaerythritol, phenol, polyvinyl alcohol, nitrocellulose, and difluoraminomethanol.

3. The process which comprises (1) reacting a reagent selected from the group consisting of

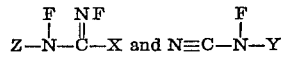

wherein —X is selected from the group consisting of

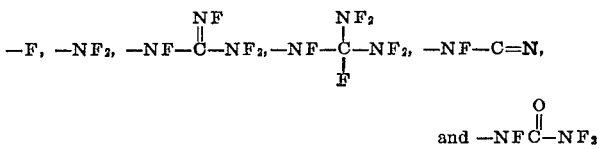

when Z— is F— and wherein —X is —NF—C≡N when Z— is N≡C— and wherein —Y is selected from the group consisting of

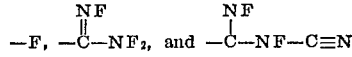

with an additive selected from the group consisting of HNCO, HNCS, and $H_2NC\equiv N$ to produce an adduct, and (2) reacting said adduct with a compound selected from the group consisting of ammonia, a lower alkylamine, a secondary lower dialkylamine, an aromatic amine, hydrazine, mono- and di-substituted hydrazine, urea, a lower alkyl amide, nitramine, a mono-substituted nitramine, and hydroxylamine.

4. The process which comprises (1) reacting a reagent selected from the group consisting of

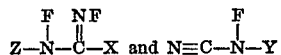

wherein —X is selected from the group consisting of

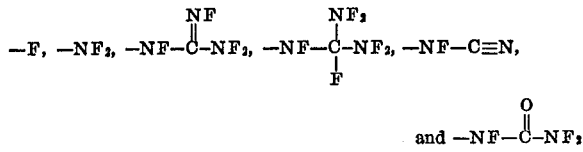

when Z— is F— and wherein —X is —NF—C≡N when Z— is N≡C— and wherein —Y is selected from the group consisting of

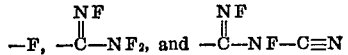

with an additive selected from the group consisting of HNCO, HNCS, and $H_2NC\equiv N$ to produce an adduct, and (2) reacting said adduct with a compound selected from the group consisting of aliphatic carboxylic, aromatic carboxylic, and water.

References Cited
UNITED STATES PATENTS

| | | | |
|---|---|---|---|
| 2,963,468 | 12/1960 | Cleaver | 260—87.5 |
| 3,149,165 | 9/1964 | Sausen | 260—583 |
| 3,166,595 | 1/1965 | Frazer | 260—583 |

LELAND A. SEBASTIAN, Primary Examiner

U.S. Cl. X.R.

149—22, 36, 109; 260—220, 453 AL, 454, 465.5 R, 479 C, 482 B, 482 C, 513.5, 553 R, 553 A, 564 R, 564 B, 583 NH, 584 A

UNITED STATES PATENT OFFICE
CERTIFICATE OF CORRECTION

Patent No. 3,699,094　　　　　　　　Dated  October 17, 1972

Inventor(s) William Charles Firth, Jr. and Simon Frank

It is certified that error appears in the above-identified patent and that said Letters Patent are hereby corrected as shown below:

Column 1, line 30, "avaliable" should read -- available --.
Column 2, line 5, "N(X₄)n  " should read -- N(X₄)n  --;

Column 2, line 30, to the right of the formula "a d" should read -- and --; Column 2, line 55, omit the word "the" before results and after and.  Column 4, line 57, "NH₂——>NH" should read -- NH₂——>-NH --.  Column 6, line 57, "XIV. X" should read -- XXIV --.  Column 7, line 38, " | " should read --|    --;
                                                                                                NF,        NF, Column 7, line 64, "perfluorodicyanoguanidlne" should read -- perfluorodicyanoguanidine --; Column 7, line 70, "reactant-" should read -- reactant. --.  Column 9, line 11, "proucing" should read -- producing --.  Column 10, line 3, "moditions" should read -- conditions --; Column 10, line 24, "multiple" should read -- multiply --; Column 10, line 74, "NF₂        "
                                                                                                                                                      -C-NF₃
                                                                                                                                                      FNCF₂ NF₂ should read -- NF₂       --.  Column 11, line 45, "    NHF"  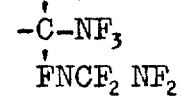
             -C-NF₂
             FNCF₂ NF₂ should read --       NHF --; Column 11, line 55 "OCH₃" should
             F₂N-C-F                                      -C=S

UNITED STATES PATENT OFFICE
CERTIFICATE OF CORRECTION

Patent No. 3,699,094     Dated October 17, 1972

Inventor(s) William Charles Firth, Jr. and Simon Frank   - 2 -

It is certified that error appears in the above-identified patent and that said Letters Patent are hereby corrected as shown below:

read -- $OCH_3$ --; Column 11, line 65, "HNNNH" should read
$-\overset{|}{C}=S$ $$\begin{matrix} \overset{|}{O=C-NH} \\ \overset{|}{F-C-NF_2} \\ \overset{|}{NF_2} \end{matrix}$$

-- $\overset{|}{HNNH}$ --. Column 12, line 10, "HN-C=O" should read
$\overset{|}{O=C-NH}$
$\overset{|}{F-C-NF_2}$
$\overset{|}{NF_2}$ $$\begin{matrix} \overset{|}{N-CH_3} \\ \overset{|}{CH_3} \end{matrix}$$

--$\overset{|}{HN-C=O}$ --. Column 14, line 46, "examples" should read
$\overset{|}{N-CH_3}$
$\overset{|}{CH_3}$ -- example --; Column 14, line 69, "$C_3H_4F_6O_2$" should read
-- $C_3H_4F_6N_4O_2$ --. Column 15, line 4, "ractor" should read
-- reactor --; Column 15, line 12, "whoe" should read
-- whose --; Column 15, line 55, "contradistriction" should
read -- contradistinction --. Column 16, line 55, "-NF-C=N,"
should read -- -NF-C≡N, --. Column 18, lines 3 and 4, insert
the word "acids" after the word "carboxylic" both times.

Signed and sealed this 1st day of May 1973.

(SEAL)
Attest:

EDWARD M. FLETCHER, JR.      ROBERT GOTTSCHALK
Attesting Officer            Commissioner of Patents